HARRIET G. EMERY & MARGARET C. FULLER.

Childrens' Corsets.

No. 4,891.

Reissued May 7, 1872.

Witnesses:
Fredk. Artos
E. Greenaway

Inventors:
H. G. Emery
M. C. Fuller by
Dyer, Beach & Co.
attys.

AM. PHOTO-LITHOGRAPHIC CO. N.Y. (OSBORNE'S PROCESS.)

UNITED STATES PATENT OFFICE.

HARRIET G. EMERY AND MARGARET C. FULLER, OF BOSTON, MASSACHUSETTS, ASSIGNORS TO HARRIET G. EMERY.

IMPROVEMENT IN CHILDREN'S CORSETS.

Specification forming part of Letters Patent No. 124,891, dated March 26, 1872; reissue No. 4,891, dated May 7, 1872.

*To all whom it may concern:*

Be it known that we, HARRIET GODFREY EMERY and MARGARET C. FULLER, of Boston, in the county of Suffolk and State of Massachusetts, have invented a new and useful Improvement in Child's Corset; and we do hereby declare that the following is a full and exact description of the same, reference being had to the accompanying drawing and to the letters of reference marked thereon.

This invention consists of a corset which is adapted by means of its peculiar construction to retain its position under all circumstances on the shoulder, to permit the movement of the arms with perfect freedom, to hold the stockings and also the clothing attached to the corset from the shoulder, and also to support in a convenient and effective manner the under-drawers, as will be fully described hereinafter.

Figure 1:
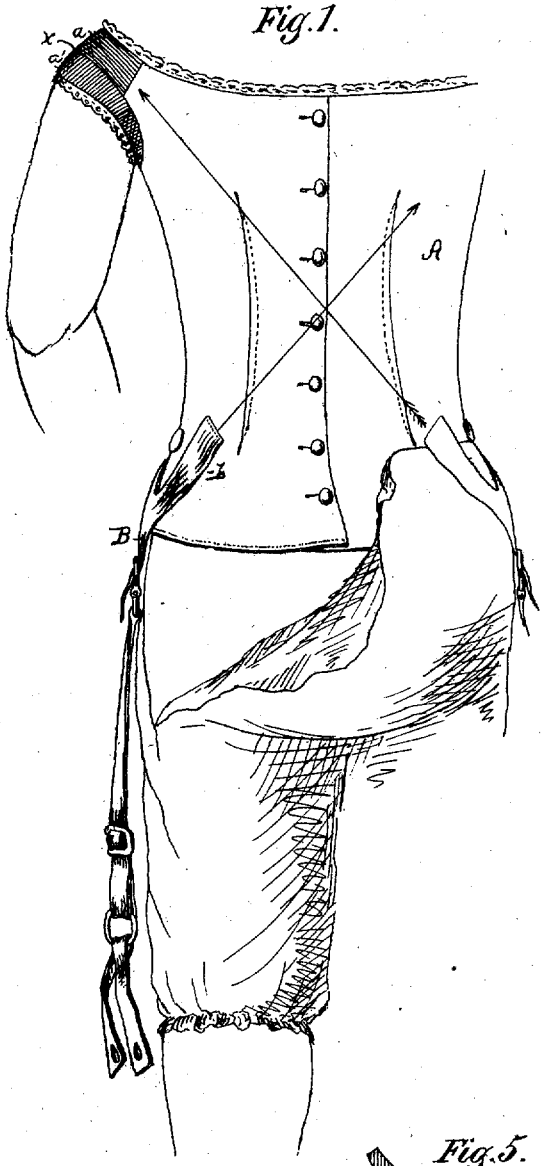
Figure 2:
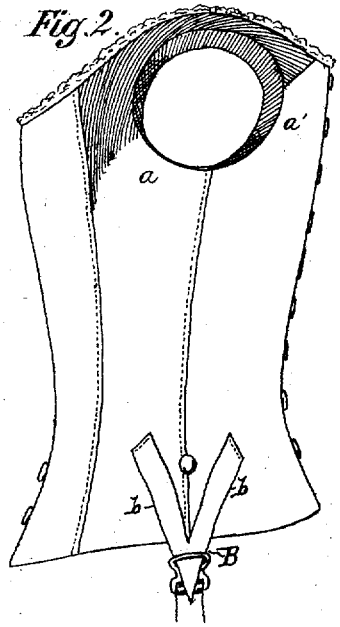
Figure 3:
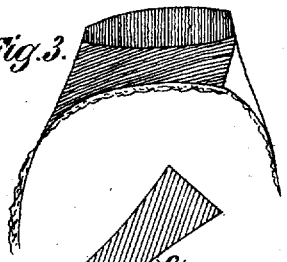

In the drawing, Figure 1 represents a partial view in perspective of the corset as applied to the person. Fig. 2 represents a side elevation; Fig. 3, a partial top view; and Figs. 4 and 5, plan views of the pieces of cloth which form the shoulder-socket.

To enable others skilled in the art to make and use our invention, we will now proceed fuly to describe the construction of the same.

Figure 4:
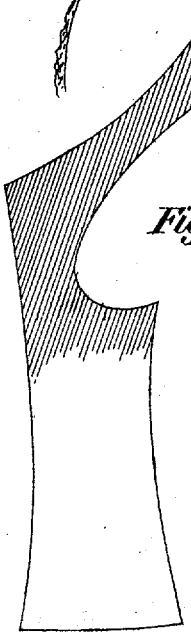
Figure 5:
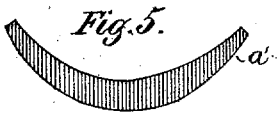

A represents the corset, which is constructed of any proper material and suitable size. It consists of suitable pieces of cloth properly attached together, the precise form of which is not absolutely essential, with the exception of the pieces *a a'*. These pieces, which are represented clearly in Figs. 4 and 5, when united together and to the remainder of the garment, form that portion of it which relates to the shoulder. The piece *a* is cut the straight way of the cloth, as shown in Fig. 4, and when in place, in consequence of its top portion being curved around to cover the shoulder, its warp-threads are caused to lie diagonally across the shoulder, as shown in Figs. 2 and 3, by which means it is rendered elastic to a certain extent. The piece *a'*, when in place, lies with its warp-thread at right angles to its length, and it has no elasticity. The form of these pieces is such, and they are so attached to the garment, that they form on the upper side a socket for the shoulder, one part being adapted to extend above and the other below the point of the shoulder, as shown in Fig. 1 at *x*. The piece *a'* decreases in width as it extends from the upper side to the lower about the shoulder-joint, until it finally practically vanishes. As this socket is not a sleeve in any respect, and therefore does not rest upon the arm at all, the latter is perfectly free to move in any direction. B represents a band, with diverging ends *b b*, which latter are attached to the corset some distance above its edge, as shown in Figs 1 and 2. To the lower end of the band B is attached a strap, which extends downward and holds the device for supporting the stockings. The ends *b b* are attached to the corset in such manner that the strain is exerted in the lines indicated by the arrows—that is, across the body to the opposite shoulder. By means of this construction it will be seen that the strain exerted by the weight of the stockings, &c., serves only to hold the garment more securely in place.

The location of the ends *b b* above the edge of the garment is advantageous in two respects: First, the lower edge of the garment is made more full than the upper portion, and is not usually accurately fitted to the person; hence, if the ends were attached to it, the weight of the clothing would draw them together, and the effect produced would be similar to that produced by a single vertical strap. Second, the location of the ends as described permits the upper portion of the under-drawers to be drawn over the lower edge of the corset, so that the drawers are held between the corset and the ends, and thus kept in place, as shown in Fig. 1.

The corset as a garment is held to be far superior to anything heretofore known.

Having thus fully described our invention, what we claim as new, and desire to secure by Letters Patent, is—

1. A corset provided with pieces *a a'*, adapted to form the shoulder-socket, as described.

2. A corset provided with a strap, B, attached at the waist point of the corset, and adapted to hold the under-drawers, as described.

3. A corset provided with a bifurcated strap, B, its ends *b b* so attached that the strain upon the corset caused by the strap and its attachments is exerted diagonally across the corset to the opposite shoulder, as shown in Fig. 1.

4. The corset A with shoulder-sockets *a a*, straps B with ends *b b* attached at the waist point of the corset, all constructed and arranged as described.

H. G. EMERY.
MARGARET C. FULLER.

Witnesses to H. G. E.:
JAMES S. GRINNELL,
H. W. BEADLE.

Witnesses to M. C. F.:
HIRAM EMERY,
JAMES THISSELL.